United States Patent Office 2,830,471
Patented Apr. 15, 1958

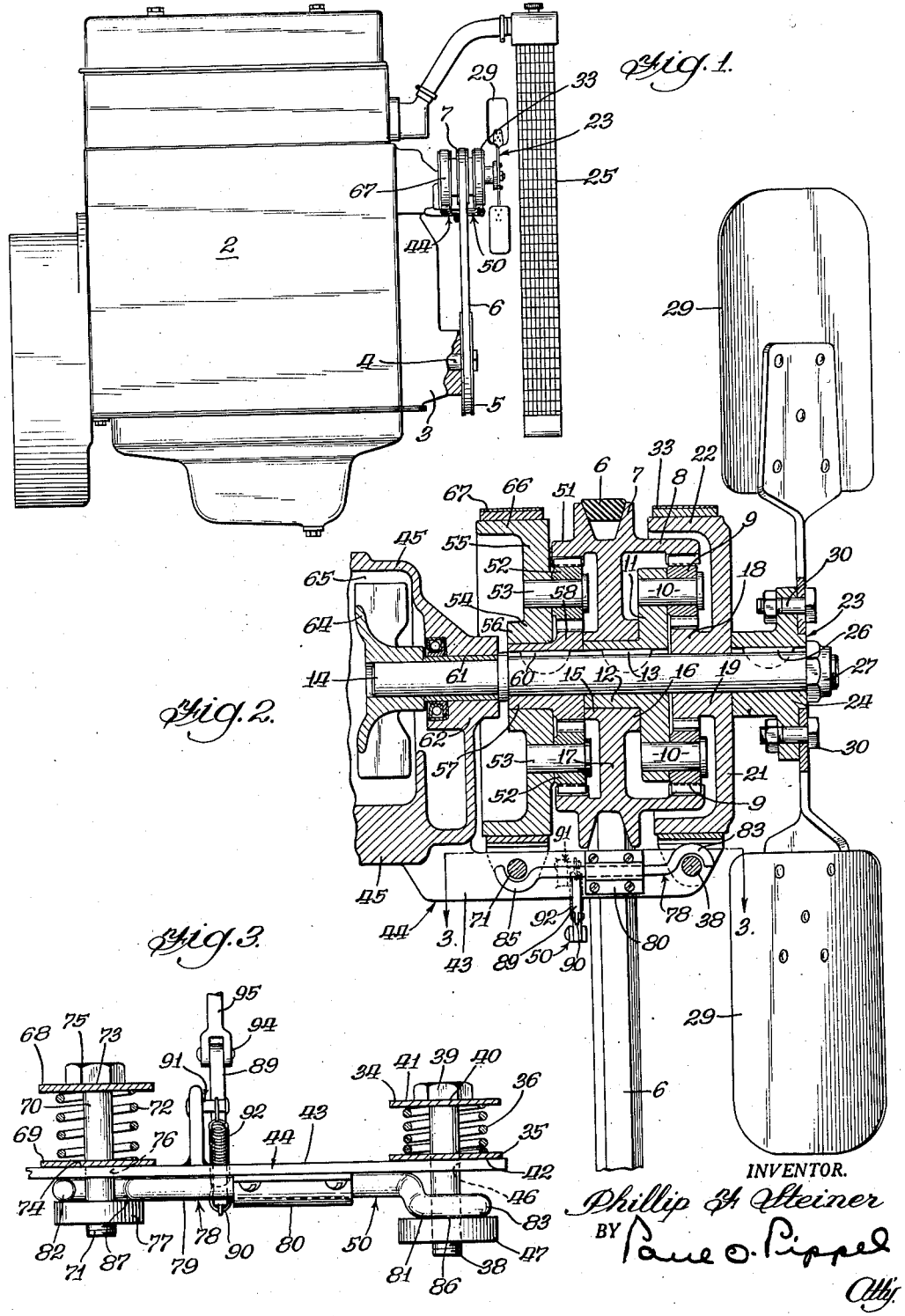

2,830,471

REVERSING PLANETARY DRIVE FOR ENGINE FAN

Phillip F. Steiner, Chicago, Ill., assignor to International Harvester Company, a corporation of New Jersey Application February 24, 1955, Serial No. 490,255

2 Claims. (Cl. 74—762)

This invention relates to a drive for an engine fan and more specifically to a novel drive for reversing the rotation of the fan so that it may either draw the air through the radiator normally disposed thereinfront or blow the air in the reversed direction through the radiator to clean out dirt and chaff.

A more specific object of the invention is to provide a novel reversing drive which may be incorporated in existing fan driving power trains.

A more specific object of the invention is to provide such a reversing drive which features a novel planetary gear system wherein certain elements are braked to effect rotation of the fan and the pump impeller shaft in one direction for normal operation and other elements of the planetary system are braked to reverse the rotation of the fan and impeller shaft, and wherein the parts are arranged to provide a compact assembly.

These and other objects of the invention will become more apparent from the specification and the drawings, wherein:

Figure 1 is a side elevational view of a conventional internal combustion fluid cooled engine incorporating the invention;

Figure 2 is a longitudinal sectional view through the fan and pump drive shown in an enlarged scale; and Figure 3 is a still further enlarged view illustrating the operating mechanism for controlling certain elements of the planetary gear system.

Describing the invention in detail, the internal combustion engine generally designated 2 comprises the engine block 3 and has a crankshaft 4 which extends from the forward end of the engine block and mounts a fan belt drive pulley 5 which is keyed suitably to the shaft 4. The pulley 5 drives the fan belt 6 which is trained thereabout and about a fan pulley 7.

The fan pulley 7 comprises a forwardly axially extending ring or orbit gear 8 which meshes with a plurality of pinions 9 which are spindled on shafts or pins 10, said pins being mounted and connected to a carrier 11 which comprises an axially extending hub or sleeve portion 12 which is keyed at 13 to the fan support and impeller driving shaft 14. The sleeve 13 extends through a centerbore 15 in the hub portion 16 of the fan pulley 7, said hub portion 16 being connected to the fan pulley 7 by a radial annular plate portion 17. The pinions 9 mesh with a sun gear 18 which is sleeved over the shaft 14 and the sun gear 18 has a forwardly extending sleeve portion 19 which is connected to a radially extending plate portion 21 which about its outer periphery is formed integral with a cylindrical brake drum member 22 which extends axially of the plate portion 21 in a rearward direction and encases the ring gear 8.

Thus the plate portion 21 forms a shield for the planetary gearing therebehind against the entry of dirt which normally would flow thereagainst pursuant to rotation of the fan assembly 23 which comprises a hub 24 sleeved over the outer end of the shaft 14 immediately in back of the radiator 25, the hub 24 being keyed as at 26 to the shaft and retained on the shaft by means of a nut 27 which is threaded on the outer end of the shaft 14. The hub 24 carries a plurality of radially outwardly extending fan blades 29 which are bolted as at 30 to said hub for rotation therewith and with the shaft 14.

The brake member 22 is encompassed or surrounded by a hoop type of a brake band 33 which at its lower free ends is provided with lugs 34 and 35 (Figure 3) between which is compressed a compression spring 36 normally tending to maintain the free ends 34 and 35 of the band 36 apart and therefore the band 33 out of braking engagement with the member 22. The lugs 34 and 35 as well as the spring 36 are sleeved over a bolt 38 which has a head 39 at one end seated as at 40 against the external side 41 of the lug 34, the lug 35 being seated at its external side 42 against a side 43 (opposing the head 39) of a mounting member and support 44 which is herein shown as formed integral with the pump housing 45, the housing being carried by the engine block 3 in the usual manner as by bolting, etc. The bolt 38 passes through an aperture 46 in the member 44 and at its opposite end is provided with a threaded abutment member 47 which may be in the form of a nut or the like and is associated with an operating linkage generally designated 50 as hereinafter described.

The pulley portion 7 is provided with a rearwardly axially extending ring gear 51 which meshes with a plurality of pinions 52 which are spindled on shafts 53 mounted on a carrier 54 generally parallel to the pins 10 and the shaft 14. The carrier 54 comprises an annular plate portion 55 which at its inner periphery is provided with a hub 56 which surrounds a sleeve portion 57 of a sun gear 58 which meshes with the pinions 52, the sleeve portion 57 being keyed as at 60 to the shaft 14. The shaft 14 has its inner end carried in a bearing 61 which is mounted within a bearing holder 62 developed on the forward side of the housing 45. The inner end of the shaft 14 is connected to an impeller 64 which operates within the pump chamber 65 which is connected to the engine block fluid circulation system and the radiator structure 25 as is conventional practice and well understood by those skilled in the art.

The carrier 55 of the rear planetary gear set is provided on its outer periphery with a cylindrical brake drum 66 which is adapted to be engaged selectively by a brake band 67 which is positioned in surrounding relationship to the member 66 and has outwardly extending lugs 68 and 69 at its lower free ends by means of which it is mounted on the shank 70 of the bolt 71. The lugs 68 and 69 receive a compression spring 72 therebetween and at their outer sides seat as at 73 and 74, respectively, against the bolt head 75 and against the opposed side 43 of the support member 44, the spring 72 functioning to constantly urge the free ends 68 and 69 of the brake band 67 apart in order to release the brake band from the drum 66. The bolt 71 passes through an opening 76 in the support 44 and at its other end is provided with an abutment member 77 which may be in the form of a threaded nut.

The brake bands 33 and 67 are alternatively engaged or disengaged with respect to their associated brake drums 22 and 66 by means of the operating linkage 50 which includes the crank member 78 which has a shaft portion 79 which extends angularly to the bolts 38 and 71, the latter being positioned generally parallel to each other. The shaft 79 is journaled for rotation by means of a bracket 80 which is secured to the support member 44 and at opposite ends is provided with oppositely extending throws 81 and 82 which extend upwardly and downwardly with respect to the axis of rotation of the shaft portion 79 and are offset with respect to one another at an angle other than 180° apart so that the portions 81 and 82 are not coplanar. The throw portion 81 comprises a hook-like part 83 which is looped over the bolt 38 in vertically spaced relationship thereto and the throw portion 82 has a similar hook-like part 85 which is disposed under the bolt 71. The throw portion 81 is normally engaged on its outer side against the inner side of the abutment member 47 as at 86 whereby the bolt 38 is drawn tight with attendant compression of the spring 36 so that hoop tension of the brake band 33 is obtained and the same is engaged with the brake member 22. Simultaneously the throw portion 82 is positioned against the member 44 and the expansion of the spring 72 is limited by abutment as at 87 of the internal side of the abutment member 77 of the bolt 71 against the external side of the portion 82 whereby a brake band 67 is normally maintained in disengaged relationship to the member 66. This relationship is obtained by the provision of an arm 89 which is connected at its upper end to the shaft portion 79 intermediate its ends and dependent therefrom beneath the member 44 and hooked to one end 90 of a tension spring which at its other end is hooked over an anchor member 91 extending laterally outwardly from the support member 44 and integrally connected thereto. The spring 92 is of sufficient capacity to overcome the resistance of and compress the spring 36. The lever member 89 is connected at its lower end as at 94 to an operating rod or member 95 which extends to a convenient position for operation by an operator.

Operation of the device

In operation the parts are normally disposed as shown in the drawings wherein the drive is transmitted from the crankshaft 4 through the crankshaft pulley 5 to the belt 6 and from thence to the pulley 7 which drives the ring gear 8 which in turn drives the pinions 9 which orbit about the sun gear 18 which is held from rotation by engagement between the element 22 and the clutching band 33. The orbiting of the planets 9 about the sun gear 18 affects rotation of the carrier 11 and it rotates the shaft 14 in one direction and thus drives the main assembly and the impeller in the same direction. Should the operator desire to reverse the direction of rotation of the fan in order to blow the air forwardly through the radiator 25, he would manipulate the operating rod 95 in a direction pushing the lever member 89 toward a viewer, as seen in the drawing, whereupon the upper throw 83 of the crank assembly 78 would be swung in a direction away from the viewer with the attendant expansion of the spring 36 and the compression of the spring 72 and the drawing up of the bolt 71.

The brake band 67 would be engaged with the brake member 66 and the brake band 33 would be released from the brake member 22. It will be seen that when the brake member 22 is released the sun gear 18 will rotate freely about the shaft 14 and, therefore, no drive will be transmitted to the carrier 11 and thence to the shaft 14. The ring gear 51 will then drive the pinions 52 which in turn will drive the sun gear 58 in a direction reverse to that described when the drive was through the pinions 9 and the carrier 11 to the shaft 14, and thus the impeller and the fan assembly will be rotated reversely to that previously described and the fan instead of drawing the air through the radiator will blow it forwardly therethrough to clean out dirt. This reverse drive will be used only for a short period of time and to reset the mechanism in its normal operating position the operator will merely release the operating linkage 95 whereupon through the influence of the spring 92 it will return to the position shown in Figures 2 and 3.

It will be understood, of course, that any operating linkage which alternatively brakes one reaction element and frees the other, such as cam actuated brakes, may be used in lieu of that shown.

What is claimed is:

1. In a reversible drive for a drive shaft for a fan disposed between a radiator and an engine, a fan connected to one end of the shaft, a driving pulley sleeved over the shaft and rotatable with respect thereto, front and rear planetary gear sets disposed ahead of and behind said pulley respectively and each including a ring gear connected to the pulley and a sun gear and pinion carrier sleeved over the shaft, the carrier of the front set and the sun gear of the rear set drivingly connected to said shaft, said sun gear of the front set disposed behind said fan and comprising a plate portion disposed in shielding relation to said gear sets and said pulley, a brake drum connected to said plate portion and extending axially away from said fan about said front planetary set, and brake bands associated with said brake drum and the carrier of the rear set for alternative, selective braking engagement therewith.

2. A reversible drive for a shaft, an annular driving element rotatably mounted upon the shaft intermediate its ends, first and second ring gears connected to the element and extending outwardly from opposite sides thereof, a first sun gear rotatably mounted on the shaft, a first carrier disposed within said first ring gear between said first sun gear and one side of said driving element within said first ring gear, a plurality of pinions rotatably mounted on the carrier and meshing with said first sun and ring gears, a brake member connected to said first sun gear overlapping said first ring gear, a second sun gear connected to the shaft adjacent to the opposite side of the driving element, a second carrier mounted for rotation about said shaft and disposed within said second ring gear, a plurality of pinions rotatably supported on the second carrier and meshing with the second ring and sun gears, a brake member connected to said second carrier, and means cooperatively associated with said brake members for selective braking engagement therewith.

References Cited in the file of this patent
UNITED STATES PATENTS

| | | |
|---|---|---|
| 1,043,344 | Newman | Nov. 5, 1912 |
| 1,327,381 | Furber | Jan. 6, 1920 |
| 2,169,121 | Coy | Aug. 8, 1939 |
| 2,555,454 | O'Leary | June 5, 1951 |
| 2,755,688 | Swennes | Jan. 24, 1956 |